UNITED STATES PATENT OFFICE.

WILLIAM CHITTENDEN TAYLOR, OF CORNING, NEW YORK, ASSIGNOR TO CORNING GLASS WORKS, OF CORNING, NEW YORK, A CORPORATION OF NEW YORK.

GLASS.

1,411,134.     Specification of Letters Patent.     Patented Mar. 28, 1922.

No Drawing.     Application filed December 24, 1920. Serial No. 432,998.

*To all whom it may concern:*

Be it known that I, WILLIAM CHITTENDEN TAYLOR, a citizen of the United States of America, and a resident of Corning, New York, have invented certain new and useful Improvements in Glass, of which the following is a specification.

Manganese dioxide ($MnO_2$) has been used for many years as a decolorizer for glass, or used in large quantities to color it amethyst red, or to cause it to absorb to a greater or less extent the visible light. I have discovered that by adding a suitable oxygen compound of chromium to a batch containing manganese dioxide, the color effect due to the dioxide can be intensified, so the amount of the latter necessary to obtain a given decolorization, or a given color, or a given absorption, can be much reduced, even to the extent of giving a glass opaque to the visible light with but a relatively small proportion of manganese. I have found it convenient to add the chromium oxygen compound in the form of potassium-dichromate ($K_2Cr_2O_7$) and found that the intensifying effect exists whenever the potassium-dichromate is used in quantities ranging from 4% to nearly 100% of the manganese-dioxide, the maximum intensifying effect being when 12 to 40 parts of the dichromate are used to 100 parts of the manganese. If, as I believe, the coloring effect produced is due to chromium-sesquioxide ($Cr_2O_3$) resulting from the decomposition of the dichromate in the furnace, these quantities of potassium dichromate are equivalent in the one case to the use of 2 parts to 50 parts of such chromium oxygen compound, and in the other to the use of between 6 to 20 parts of such chromium oxygen compound, to 100 parts of the manganese-dioxide. If the potassium-dichromate is used in quantities in excess of that above given there is a tendency to impart an amber and in still greater quantities a greenish color to the glass. As illustrating the scope of this invention the following is given:

By using 1/100th of 1% of potassium-dichromate and 1/100th of 1% of manganese-dioxide a decolorizing effect is produced equal to that produced by 10 times that quantity of manganese-dioxide if used without the dichromate.

A further example is given by the following batch formula giving a glass which is absolutely opaque to the visible light in plates 2 mm thick while having a considerable infra-red transmission:

Glass A.

| | |
|---|---|
| $SiO_2$ (silica) | 46% |
| PbO (litharge) | 33% |
| $K_2O$ (potash) | 14% |
| $MnO_2$ (manganese dioxide) | 6% |
| $K_2Cr_2O_7$ (potassium dichromate) | 1% |

This glass without the chromate is appreciably transparent, not only to blue but also to red light, and to obtain without the chromates the same red absorption the manganese-dioxide content would have to be increased several fold.

Another example of batch formula giving a glass in which chromate can be used to advantage to produce a dark red where without it many times as much manganese will be required is the following:

Glass B.

| | |
|---|---|
| $SiO_2$ (silica) | 70% |
| CaO (lime) | 7½% |
| $Na_2O$ (soda) | 20½% |
| $MnO_2$ (manganese dioxide) | 1½% |
| $K_2Cr_2O_7$ (potassium dichromate) | ½% |

Other examples of batch formulæ falling within this invention are as follows:

| | C | D | E | F |
|---|---|---|---|---|
| $SiO_2$ (silica) | 49% | 49% | 48% | 49% |
| PbO (litharge) | 36 | 36 | 36 | 36 |
| $K_2O$ (potash) | 15 | 15 | 15 | 15 |
| $MnO_2$ (manganese dioxide) | ¼ | ½ | 1 | 1/100 |
| $K_2Cr_2O_7$ (potassium dichromate) | 1/10 | 1/10 | 1/10 | 1/100 |

This application is filed as a continuation in part of my prior application 430393, filed Dec. 13, 1920.

What is claimed is:—

1. The process of intensifying the color action due to manganese-dioxide by adding to the glass an oxygen compound of chromium.

2. A batch for a glass containing manganese-dioxide and an oxygen compound of chromium.

3. A batch for a glass containing manganese-dioxide and an oxygen-chromium compound, which, measured as a sesquioxide is in the proportion of 100 parts of the former to between 2 to 50 parts of the latter.

4. A batch for a glass containing manganese-dioxide and an oxygen compound of chromium, which, measured as a sesquioxide, is in the proportion of 6 to 20 parts of such oxide to 100 parts of the manganese-dioxide.

5. A glass containing manganese-dioxide and an oxygen compound of chromium.

6. A glass containing manganese-dioxide and an oxygen chromium compound, which, measured as a sesquioxide is in the proportion of 100 parts of the former to between 2 to 50 parts of the latter.

7. A glass containing manganese-dioxide and an oxygen compound of chromium, which, measured as a sesquioxide, is in the proportion of 6 to 20 parts of such oxide to 100 parts of the manganese-dioxide.

In testimony whereof, I hereunto affix my signature this 20th day of December, 1920.

WILLIAM CHITTENDEN TAYLOR.